United States Patent
Heiber et al.

(10) Patent No.: US 11,279,832 B2
(45) Date of Patent: Mar. 22, 2022

(54) (METH)ACRYLATE BASED RESIN BINDER COMPOSITION

(71) Applicants: Roehm GmbH, Darmstadt (DE); Evonik Corporation, Parsippany, NJ (US)

(72) Inventors: William G. Heiber, Salem, OR (US); Levi F. Scott, Upper Darby, PA (US); Oliver Schmidt, Freigericht (DE); Alexander Klein, Gau-Algesheim (DE)

(73) Assignees: Roehm GmbH, Darmstadt (DE); Evonik Corporation, Parsippany, NJ (US)

(*) Notice: Subject to any disclaimer, the term of this patent is extended or adjusted under 35 U.S.C. 154(b) by 0 days.

(21) Appl. No.: 16/335,551

(22) PCT Filed: Sep. 21, 2017

(86) PCT No.: PCT/US2017/052759
§ 371 (c)(1),
(2) Date: Mar. 21, 2019

(87) PCT Pub. No.: WO2018/057764
PCT Pub. Date: Mar. 29, 2018

(65) Prior Publication Data
US 2019/0264042 A1 Aug. 29, 2019

Related U.S. Application Data

(60) Provisional application No. 62/399,011, filed on Sep. 23, 2016.

(51) Int. Cl.
| | |
|---|---|
| *C09D 7/63* | (2018.01) |
| *C09D 133/10* | (2006.01) |
| *C09D 7/45* | (2018.01) |
| *C09D 4/00* | (2006.01) |
| *C09D 5/00* | (2006.01) |
| *C08K 5/09* | (2006.01) |
| *C09D 7/65* | (2018.01) |

(52) U.S. Cl.
CPC ............. *C09D 4/00* (2013.01); *C09D 5/00* (2013.01); *C09D 7/45* (2018.01); *C09D 7/63* (2018.01); *C09D 133/10* (2013.01); *C08K 5/09* (2013.01); *C09D 7/65* (2018.01)

(58) Field of Classification Search
CPC .......... C09D 7/63; C09D 133/10; C09D 7/45
USPC ...................................................... 523/172
See application file for complete search history.

(56) References Cited

U.S. PATENT DOCUMENTS

| | | | | |
|---|---|---|---|---|
| 6,461,421 | B1 * | 10/2002 | Ronvak ........... | C08L 95/00 106/273.1 |
| 6,987,207 | B1 * | 1/2006 | Ronyak ........... | C08K 5/04 106/273.1 |
| 7,049,355 | B2 | 5/2006 | Quis et al. | |
| 2002/0002259 | A1 * | 1/2002 | Quis ............... | C09D 4/00 526/323.1 |
| 2009/0253845 | A1 * | 10/2009 | Neugebauer ..... | C09D 4/06 524/423 |
| 2013/0168018 | A1 | 1/2013 | Xia et al. | |
| 2014/0128536 | A1 | 5/2014 | Hilf et al. | |
| 2014/0352887 | A1 | 12/2014 | Casimiro et al. | |

FOREIGN PATENT DOCUMENTS

| | | |
|---|---|---|
| DE | 10 2009 044 223 A1 | 5/2011 |
| JP | 2002-20440 A * | 1/2002 |
| JP | 3774287 B2 * | 5/2006 |

OTHER PUBLICATIONS

International Search Report and Written Opinion dated Dec. 7, 2017 in PCT/US2017/052759 filed on Sep. 21, 2017.

* cited by examiner

*Primary Examiner* — Deve V Hall
(74) *Attorney, Agent, or Firm* — Oblon, McClelland, Maier & Neustadt, L.L.P.

(57) ABSTRACT

This invention is directed to a polymerizable, cold-curing (meth)acrylate system for floor coating.

10 Claims, No Drawings

(METH)ACRYLATE BASED RESIN BINDER COMPOSITION

BACKGROUND OF THE INVENTION

1. Field of the Invention

The present invention relates to a polymerizable, cold-curing (meth)acrylate system for a floor coating. The invention also relates to a coated floor, that can be obtained using an appropriate low-odor, polymerizable, cold-curing reactive (meth)acrylic system. The invention also includes a process for preparing a coated surface, especially a floor.

2. Discussion of the Related Art

The reaction of methyl (meth)acrylate based resin binders during floor coating application is normally associated with a strong offensive odor. Methy (meth)acrylate based reaction resins containing volatile monomers provide excellent curing even at high ambient temperatures and are most suitable outdoor applications, such as road marking for instance. Frequently, during the initial phase of application prior to curing, a small amount of volatile substance evaporates from the resin binder composition, creating a strong and pungent odor. This odor has been offensive to the applicator and passers by in the immediate vicinity of the application.

The prior art has attempted to develop a cold-curing (meth)acrylate system that has reduced volatility. Low-odor (meth)acrylate systems are, for example, described in JP 95-46571 disclosing a system that contains unsaturated resins, cyclopentadienyl (meth)acrylates, crosslinking agents such as, for example, organic peroxides, and accelerators such as metal salts of organic acids. It was shown that a system that includes cumene hydroperoxide as the hardener and cobalt octanoate as the accelerator, hardens.

Additional systems that likewise use cumene hydroperoxide and cobalt octanoate are described in Japanese disclosures JP 95-5661 and JP 94-199 427.

Although these systems solve the problem of the offensive odor, health risks during application of these systems remain due to the use of the problematical reaction system of the compound and cumene hydroperoxide.

Low-odor cold curing (meth) acrylate reaction resins have also been developed as disclosed in U.S. Pat. No. 7,049,355 as well as US Publication No. 2014/0128536, which attempts to modify the active substituent in the floor coating application. These attempts have been done to modify the reactive species.

The prior art attempts to develop a cold-curing (meth) acrylate system with reduced volatility for ambient curing are facing difficulties to provide proper surface curing particularly at elevated ambient temperatures at 40° C. or above. In consideration of the state of the art, it is a goal of the present invention to make available a method for camouflaging the odor of cold-curing (meth)acrylate reaction resins for a floor coating that has without compromising on the properties of the coating, such as hardness of the coating.

SUMMARY OF THE INVENTION

The present invention relates to an innovative cold-curing (meth)acrylate reaction resin for floor coating, comprising a) at least one reactive resin binder; and b) at least one odor masker.

In another embodiment, the present invention relates to an innovative cold-curing (meth)acrylate reaction resin for floor coating, comprising a) at least one reactive resin binder; b) at least one odor masker; c) at least one dispersing additive; d) at least one rheology additive; e) at least one pigment; and f) at least one filler.

In another embodiment, the present invention relates to a method for producing a cold curing (meth)acrylate reaction resin which comprises a) blending at least one odor masker and at least one is blended with the reactive resin binder, followed by b) blending at least one dispersing additive; at least one rheology additive; at least one pigment; and at least one filler on a reaction vessel.

DESCRIPTION OF THE PREFERRED EMBODIMENTS

Generally, reactive resin binders, especially in applications for floor coating, contain methyl methacrylate and n-butyl acrylate or 2-ethylhexyl acrylate, or the like in a monomeric component or combinations thereof. In practice, a hardener component is added to polymerize the reaction during the curing process prior to the application on the floor.

For purposes of this invention, floor coating is a broad term to include coating of flat surfaces, usually associated with surface signalization layers or surface protection layers or membrane systems for building structures or high traffic areas, in particular applications as road markings.

The monomeric component of the reactive resin binder is converted into a polymer during this chemical curing process. In most cases, and dependent on the temperature, pressure and other atmospheric conditions, full curing take place within an hour, leading to a durable floor coating. Nevertheless, the initial application process in which the monomeric component is applied, prior to polymerization, introduces a particularly foul smelling condition.

The inventors herein have found a solution to the harsh odor from the (meth)acrylate monomeric resin binder that is applied as floor coating composition by the addition of a certain type of odor masker. It is important that the odor masker does not interfere with the properties of the coating composition.

For purposes of this invention, the term (meth)acrylate generally include all resin binder reactants that includes methacrylate and acrylate as a based. For example, included, but not limited, in this invention as referenced to (meth) acrylate are methacrylate, n-butylacrylate and 2-ethylhexyl acrylate. Moreover, (meth)acrylate, in this invention, has the meaning of the examples below.

Examples of acrylates that can be used within the scope of the invention are, but not limited to, alkylacrylates such as bis-2-methylacrylate acid ester (isocrotonic acid ester), trans-2-methylacrylic acid ester (isocrotonic acid ester); arylacrylates such as substituted benzylacrylates; or unsaturated alkylacrylates such as, for example, allyl acrylate.

Methacrylates that can be used especially successfully within the scope of the invention include, but are not limited to, alkylmethacrylates derived from saturated alcohols such as isopropyl methacrylate, propyl methacrylate, n-butyl methacrylate, tert-butyl methacrylate, n-hexyl methacrylate, n-octyl methacrylate, n-decyl methacrylate, isooctyl methacrylate, and tetradecyl methacrylate.

Alkylmethacrylates that can be used within the scope of the invention are, but not limited to, those derived from unsaturated alcohols such as, oleyl methacrylate, 2-propynyl methacrylate, allyl methacrylate, and vinyl methacrylate.

Amides and nitriles of methacrylic acid that can be used within the scope of the invention are, but not limited to, N-(methylaminopropyl)methacrylamid, N-(diethylphosphono)methacrylamide, 1-methacryloylamido-2-methyl-2-propanol, N-(3-dibutylaminopropyl)methacrylamide, N-t-butyl-N-(diethylphosphono)methacrylamide, N,N-bis(2-diethylaminoethyl)methacrylamide, 4-methacryloylamido-4-methyl-2-pentanol, methacryloyamidoacetonitrile, N-(methoxymethyl)methacrylamide, N-(2-hydroxyethyl)methacrylamide, N-acetylmethacrylamide, N-(dimethylaminoethyl)methacrylamide, N-methyl-N-phenylmethacrylamide, N,N-dimethylmethacrylamide, N-methylmethacrylamide, N,N-dimethylmethacrylamide, and N-isopropylinethacrylamide.

Other nitrogen-containing methacrylates that can be used within the scope of the invention include, but not limited to N-(methacryloyloxyethyl)diisobutylketimine, 2-methacryloyloxyethylmethylcyanimide, cyanomethyl methacrylate.

Aryl methacrylates that can be used within the scope of the invention are, but not limited to, nonylphenyl methacrylate, benzyl methacrylate, phenyl methacrylate, wherein the aryl residue in each case can be nonsubstituted or substituted up to 4 times.

Carbonyl-containing methacrylates that can be used within the scope of the invention are, but not limited to, 2-carboxyethyl methacrylate, carboxymethyl methacrylate, N-(2-methacryloyloxyethyl)-2-pyrrolidinone, N-(3-methacryloyloxypropyl)-2-pyrrolidinone, N-methacryloylmorpholine, oxazolidinylethyl methacrylate, N-(methacryloyloxy)formamide, acetonyl methacrylate, N-methacryloyl-2-pyrrolidinone.

Cycloalkyl methacrylates that can be used within the scope of the invention are, but not limited to, 3-vinylcyclohexyl methacrylate, 3,3,5-trimethylcyclohexyl methacrylate, bornyl methacrylate, cyclopenta-2,4-dienyl methacrylate, isobornyl methacrylate, and 1-methylcyclohexyl methacrylate.

Glycol dimethacrylates that can be used within the scope of the invention are, but not limited to, 1,4-butanediol methacrylate, methylene methacrylate, 1,3-butanediol methacrylate, triethylene glycol methacrylate, 2,5-dimethyl-1,6-hexanediol methacrylate, 1,10-decanediol methacrylate, 1,2-propanediol methacrylate, diethylene glycol methacrylate, and ethylene glycol methacrylate.

Hydroxyalkyl methacrylates that can be used within the scope of the invention are, but not limited to, 3-hydroxypropyl methacrylate, 3,4-dihydroxybutyl methacrylate, 2-hydroxyethyl methacrylate, and 2-hydroxypropyl methacrylate.

Methylacrylates of ether alcohols that can be used within the scope of the invention are, but not limited to, tetrahydrofurfuryl methacrylate, vi nyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, and ethoxymethyl methacrylate.

Methacrylates of halogenated alcohol moieties that can be used within the scope of the invention are, but not limited to, 2,3-dibromopropyl methacrylate, 4-bromophenyl methacrylate, 1,3-dichloro-2-propyl methacrylate, 2-bromoethyl methacrylate, 2-iodoethyl methacrylate, and chloromethyl methacrylate.

Oxiranyl methacrylates that can be used within the scope of the invention are, but not limited to, 10,11-epoxyundecyl methacrylate, 2,3-epoxycyclohexyl methacrylate, 2,3-epoxybutyl methacrylate, 3,4-epoxybutyl methacrylate, and glycidyl methacrylate.

Phosphorus-, boron- and/or silicon-containing methacrylates that can be used within the scope of the invention are, but not limited to, 2-(dibutylphosphono)ethyl methacrylate, 2,3-butylenemethacryloylethyl borate, 2-(dimethylphosphato)propyl methacrylate, methyldiethoxymethacryloylethoxysilane, 2-(ethylenephosphito)propyl methacrylate, dimethylphosphinomethyl methacrylate, dimethylphosphonoethyl methacrylate, diethylmethacryloyl phosphonate, diethylphosphatoethyl methacrylate, and dipropylmethacryloyl phosphate.

Sulfur-containing methacrylates that can be used within the scope of the invention are, but not limited to ethylsulfinylethyl methacrylate, 4-thiocyanatobutyl methacrylate, ethylsulfonylethyl methacrylate, thiocyanatomethyl methacrylate, methylsulfinylmethyl methacrylate, and bis(methacryloyloxyethyl) sulfide.

Trimethacrylates that can be used within the scope of the invention include, but not limited to, trimethyloylpropane trimethacrylate.

Acrylates corresponding to methacrylates that have a boiling point greater than 120° C. can likewise be used.

The indicated compounds can also be used as mixtures. (Meth)acrylates in which the alcohol residue contains 3 to 5 carbon atoms are preferred. Although longer-chained esters, that is compounds in which the alcohol moiety contains 7 or more carbon atoms, make the coatings more flexible; they also make them softer so that their usage properties are limited. For this reason their proportion is limited to 50 wt % or less. In another embodiment, their proportion is limited to 45 wt % or less. In yet another embodiment, their proportion is limited to 40 wt % or less.

In an embodiment, the resin binder is Degaroute® 465.

The odor masker of this invention is selected to be sufficient in camouflaging the odiferous nature of the binder resin (including the binder) in an amount that does not impact on curing time and hardness of the coating.

In an embodiment, odor masker containing ethyl butyrate demonstrated superior results.

In another embodiment, the odor masker from Stanly Schoenmann Inc., Clark, N.J. has demonstrated superior results in masking the odor of the resin binder.

In another embodiment, the odor masker from Chimia Corp., Maryland Heights, Mo. has demonstrated superior results in masking the odor of the resin binder. In an embodiment, Pineapple based product #002016, from Chimia Corp, is preferred.

In an embodiment, the odor masker is from 0.05 wt % to 5 wt % of the total composition. In another embodiment, the odor masker is from 0.09 wt % to 2 wt % of the total composition.

Separately, in another embodiment, the odor masker is from 0.05 wt % to 3 wt % of the total composition. In another embodiment, the odor masker is from 0.09 wt % to 1.5 wt % of the total composition. In yet another embodiment, the odor masker is from 0.2, wt % to 9 wt % of the total composition.

In an embodiment, the odor masker is 0.4 wt % of the total composition.

The dispersing additives includes all conventional dispersing additives known to the art that are suitable for the applications in this invention. The dispersing additives is preferably less than 1 wt % of the total composition. In an embodiment, the dispersing additives is about 0.1 wt % of the total composition. In an embodiment, the dispersing additive is Disperbyk™ 167, available from BYK-Chemie GmbH, Wesel, Germany.

The rheology additive includes all conventional rheology additives known to the art that are suitable for the applications in this invention. The rheology additives is preferably less than 1 wt % of the total composition. In an embodiment, the rheology additives is about 0.3 wt % of the total composition. In an embodiment, the rheology additive is Bentone™ 27, available from Elementis Specialties, Inc. East Windsor, N.J. USA.

The pigment includes all conventional pigments known to the art that are suitable for the applications in this invention or mixes thereof. The pigment is preferably between 2-15 wt % of the total composition. In an embodiment, the pigment is between 2-10 wt % of the total composition. In an embodiment, the pigment is about 3-5 wt % of the total composition. In an embodiment, the pigment is titanium dioxide, Huntsman Tioxide TR92, Huntsman Pigments and Additives Division, Wynyard Park, UK, In an embodiment, the pigment is Tomatenrot™ G10345, available from Heubach GmbH, -Langelsheim, Germany.

Another important group of substances among the additives and added substances is a filler. In an embodiment, the filler is Omyacarb™ 15, available from Omya AG, Oftringen, Switzerland.

As a filler and/or pigment in the liquid resin binder preparation, all conventional filler are suitable such as, e.g., a natural and synthetic calcium carbonate, dolomite, calcium sulfate, a silicate such as, e.g. aluminum silicate, zirconium silicate, talc, kaolin, mica, feldspar, nepheline, syslite, wollastonite, glass beads or silicate beads, silicon dioxide in the form of sand, quartz, quartzite, novaculite, perlite, tripoli, and diatomaceous earth, a barium sulfate, a carbide such as SiC, a sulfide (e.g., $MoS_2$, $ZnS$), or also a titanate such as, e.g., $BaTiO_3$, a molybdate such as, e.g., zinc, calcium, barium or strontium molybdates, and a phosphate such as, e.g., of zinc, calcium or magnesium. Likewise well-suited are metal powders or metal oxides such as, e.g., aluminum powder, silver powder, or aluminum hydroxide. Also used are graphite powder, a synthetic fiber (based on polyethylene terephthalate, polyvinyl alcohol), a basalt fiber, a carbon fiber, an aramide fiber, polybenzimidazole fibers, PEEK fibers, polyethylene fibers, boron fibers, or ceramic fibers. The usual percentage amount with respect to the overall composition is between 0 and 60% wt/wt.

Compounds for floor coatings are typically prepared by stirred mixing in batch-type processes. In an embodiment of the invention, the odor masker is blended with the reactive resin binder before other constituents of the floor coating, such as additives, fillers and pigments are subsequently blended.

Having generally described this invention, a further understanding can be obtained by reference to certain specific examples, which are provided herein for purposes of illustration only and are not intended to be limiting unless otherwise specified.

EXAMPLES

Comparative Example 1

Parts by weight of the following cold plastic material constitute as follows, whereby the odor masker is mixed into the resin before the remaining constituents are added in the sequence as listed:

| | Component | wt % |
|---|---|---|
| Resin | Degaroute ® 465* | 40.00 |
| Odor Masker | Pineapple # 002016 | 0.04 |
| Dispersing additive | Disperbyk ™ 167 | 0.10 |
| Rheology additive | Bentone ™ 27 | 0.30 |
| Pigment | Tomatenrot ™ G10345 | 5.00 |
| Filler | Omyacarb ™ 15 GU | 54.6 |
| | Total: | 100.00 |
| | Odor Rating: | C |

*Available from Evonik Resource Efficiency GmbH, Hanau-Wolfgang, Germany

The odor of this cold plastic material was rated C. The dosage of the odor masker is insufficient to cover the smell of the monomer component of the resin binder.

The Odor Rating was ascertained by taking the subjective rating of a panel of eight test persons on the odor of a 200 ml paper cup having 4.5 cm bottom diameter filled with 50 g of material having 23° C.±1° C. temperature according to the following classification:

A: pleasant
B: decent
C: pungent

Curing characteristics and Shore-D hardness and odor on addition of 2 wt % hardener powder with 50 wt % active content di-benzoyl peroxide and curing at 23° C. at 2 mm layer thickness:

| | |
|---|---|
| Pot Life (minutes) | 13 |
| Curing Time (minutes) | 31 |
| Shore D after 3 days | 52 |

Pot Life was ascertained by determining the time taken for 50 g material, after stirred incorporation of 1 g hardener powder, to warm up by itself from room temperature (23° C.±1° C.) to 32° C.

Curing time was ascertained by determining the time for the material stored at room temperature (23° C.±1° C.), after addition of 2 wt % hardener powder and application at 2 mm layer thickness at room temperature, to provide a tack-free surface.

Shore-D hardness was determined at (23° C.±1° C.) according to DIN 53505 72 h after curing at room temperature.

Inventive Examples 1-2

Parts by weight of the following cold plastic material constitute as follows, whereby the odor masker is mixed into the resin before the remaining constituents are added in the sequence as listed:

| | | Inventive Example No. | |
|---|---|---|---|
| | | 2 wt % | 3 wt % |
| Resin | Degaroute ® 465* | 40.00 | 40.00 |
| Odor masker | PINEAPPLE # 002016 | 0.20 | 0.40 |
| Dispersing additive | Disperbyk ™ 167 | 0.10 | 0.10 |
| Rheology additive | Bentone ™ 27 | 0.30 | 0.30 |
| Pigment | Tomatenrot ™ G10345 | 5.00 | 5.00 |
| Filler | Omyacarb ™ 15 GU | 54.40 | 54.20 |

-continued

| | Inventive Example No. | |
|---|---|---|
| | 2 wt % | 3 wt % |
| Summary: | 100.00 | 100.00 |
| Odor Rating | B | A |

*Available from Evonik Resource Efficiency GmbH, Hanau-Wolfgang, Germany

Properties on addition of 2 wt % hardener powder with 50 wt % active content di-benzoyl peroxide and curing at 23° C. at 2 mm layer thickness:

| Inventive Example No. | 2 | 3 |
|---|---|---|
| Pot Life (minutes) | 13 | 13 |
| Curing Time (minutes) | 31 | 31 |
| Shore D after 3 d | 52 | 50 |

The unpleasant smell of the monomer component of the resin binder is masked with no impact on curing time and hardness of the coating.

On addition of 2 wt % hardener powder with 50 wt % active content di-benzoyl peroxide and curing at 40° C. at 2 mm layer thickness a tackfree surface is obtained within 18 min curing time.

Inventive Examples 3-6

Parts by weight of the following cold plastic material constitute as follows, whereby the odor masker is mixed into the resin binder before the remaining constituents are added in the sequence as listed:

| | | Inventive Example No. | | | |
|---|---|---|---|---|---|
| | | 3 wt % | 4 wt % | 5 wt % | 6 wt % |
| Binder/resin | Degaroute ® 465 | 40.00 | 40.00 | 40.00 | 40.00 |
| Odor masker | MULBERRY # 060990 | 0.40 | | | |
| Odor masker | MANGO # 003047 | | 0.40 | | |
| Odor masker | Bubblegum #2270 | | | 0.40 | |
| Odor masker | Bubble Gum #77066 | | | | 0.40 |
| Dispersing additive | Disperbyk ™ 167 | 0.10 | 0.10 | 0.10 | 0.10 |
| Rheology additive | Bentone ™ 27 | 0.30 | 0.30 | 0.30 | 0.30 |
| Pigment | Tomatenrot ™ G10345 | 5.00 | 5.00 | 5.00 | 5.00 |
| Filler | Omyacarb ™ 15 GU | 54.20 | 54.20 | 54.20 | 54.20 |
| | Total | 100.00 | 100.00 | 100,00 | 100,00 |
| | Odor Rating | A | A | A | B |

*Available from Evonik Resource Efficiency GmbH, Hanau-Wolfgang, Germany

Properties on addition of 2 wt % hardener powder with 50 wt % active content di-benzoyl peroxide and curing at 23° C. at 2 mm layer thickness:

| Inventive Example No. | 3 | 4 | 5 | 6 |
|---|---|---|---|---|
| Pot Life (minutes) | 13 | 13 | 13 | 13 |
| Curing Time (minutes) | 31 | 31 | 31 | 31 |
| Shore D after 3 d | 47 | 48 | 46 | 47 |

The pungent smell of the monomer component of the resin binder is masked with no impact on curing time and only minor impact on hardness of the coating.

Comparative Example 2

If a cold plastic material is produced with the same constituents as given in inventive example 6, whereby all other components are mixed before the odor masker is added, the unpleasant monomer smell is less efficiently covered compared to the production sequence used to produce innovative example 6.

Parts by weight of the following cold plastic material constitute as follows, whereby the odor masker is feed after all other constituents are mixed in the sequence as listed:

| | Comparative Example No. 2 | wt % |
|---|---|---|
| Binder/resin | Degaroute ® 465 | 40.00 |
| Dispersing additive | Disperbyk ™ 167 | 0.10 |
| Rheology additive | Bentone ™ 27 | 0.30 |
| Pigment | Tomatenrot ™ G10345 | 5.00 |
| Filler | Omyacarb ™ 15 GU | 54.20 |
| Odor masker | Bubble Gum Fragrance Mask #77066 | 0.40 |
| | Total | 100.00 |
| | Odor Rating | C |

The invention claimed is:

1. A cold-curing (meth)acrylate reaction resin for floor coming, comprising:
   a) at least one reactive resin binder; and
   b) at least one odor masker,
   wherein the at least one odor masker comprises ethyl butyrate, and
   wherein a content of ethyl butyrate ranges from 0.2 wt % to 5 wt % based on a total weight of the resin.

2. The cold curing (meth)acrylate reaction resin of claim 1, wherein a content of ethyl butyrate ranges from 0.4 wt % to 5 wt % based on a total weight of the resin.

3. The cold curing (meth)acrylate reaction resin of claim 1, wherein a content of ethyl butyrate ranges from 0.2 wt % to 2 wt % based on a total weight of the resin.

4. A cold plastic material, comprising the cold curing meth)acrylate reaction resin of claim 1,
   wherein the cold plastic material is a coating on a surface selected from the group consisting of a road pavement, a concrete floor, a roof, and a bridge deck.

5. A cold-curing (meth)acrylate reaction resin for floor coating, comprising:
   a) at least one reactive resin binder;

b) at least one odor masker;
c) at least one dispersing additive;
d) at least one rheology additive;
e) at least one pigment; and
f) at least one filler,
wherein the at least one odor masker comprises ethyl butyrate, and
wherein a content of ethyl butyrate ranges from 0.2 wt % to 5 wt % based on a total weight of the resin.

6. The cold curing (meth)acrylate reaction resin of claim 5, wherein a content of ethyl butyrate ranges from 0.2 wt % to 3 wt % based on a total weight of the resin.

7. The cold curing (meth)acrylate reaction resin of claim 5, wherein a content of ethyl butyrate ranges from 0.4 wt % to 1.5 wt % based on a total weight of the resin.

8. The cold curing (meth)acrylate reaction resin of claim 5, wherein a content of ethyl butyrate ranges from 0.2 wt % to 0.9 wt % based on a total weight of the resin.

9. A cold plastic material, comprising the cold curing (meth)acrylate reaction resin of claim 5,
wherein the cold plastic material is a coating on at least e selected from the group consisting of a road pavement, a roof, and a bridge deck.

10. A cold plastic material, comprising the cold curing (meth)acrylate reaction resin of claim 1,
wherein the cold plastic material is a road marking.

\* \* \* \* \*